March 11, 1930. W. A. BONNELL 1,750,257
OUTLET BOX CLAMP BUSHING
Filed Oct. 2, 1926
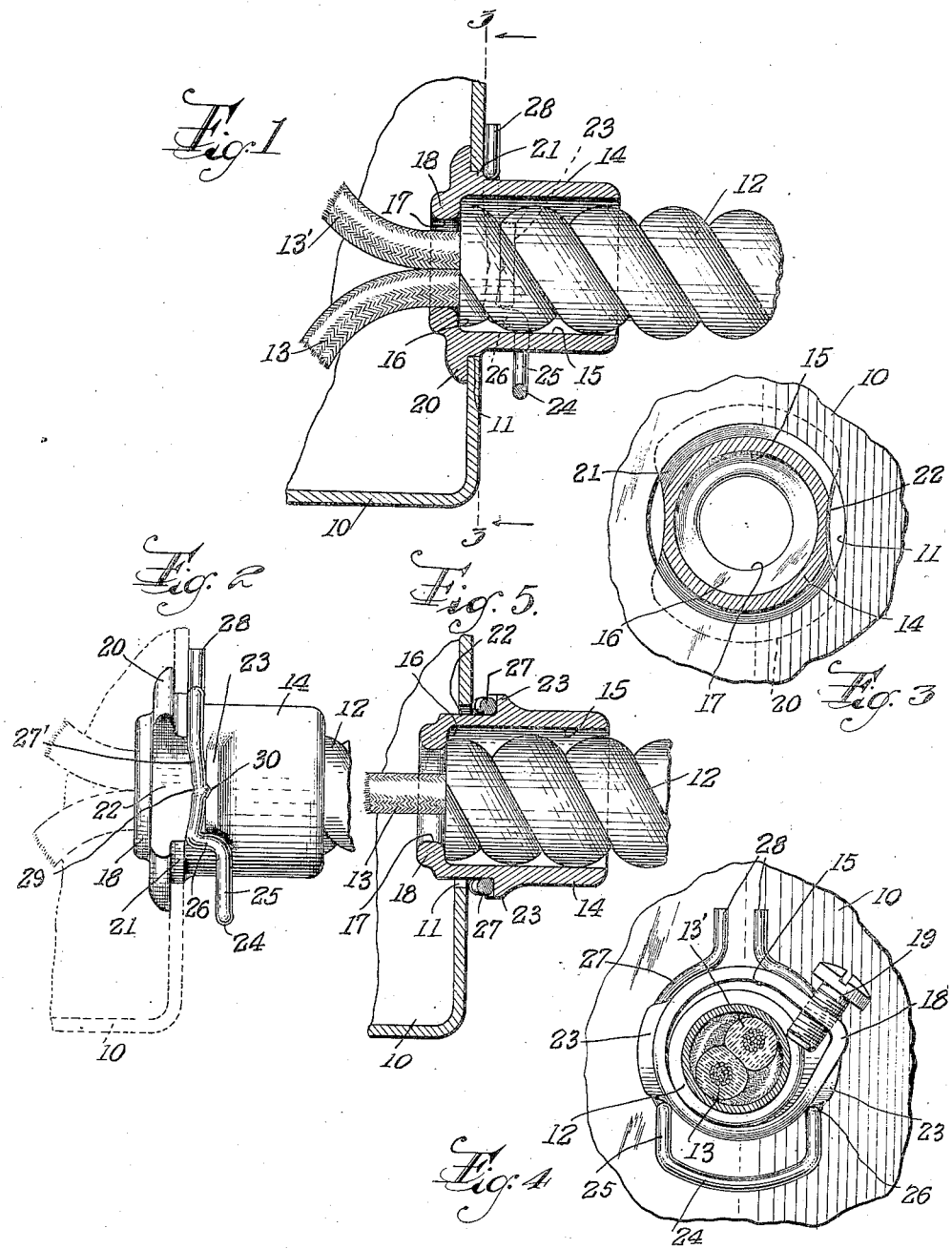
INVENTOR
William A. Bonnell
BY
Frank C. Fischer
ATTORNEY Patented Mar. 11, 1930

1,750,257

UNITED STATES PATENT OFFICE

WILLIAM A. BONNELL, OF BROOKLYN, NEW YORK

OUTLET-BOX CLAMP BUSHING

Application filed October 2, 1926. Serial No. 139,153.

This invention relates to outlet boxes used in electric wiring installations and more particularly to devices for anchoring conduits or armored cables to such boxes.

The difficulty in making firm, reliable connections to outlet boxes is well known and the danger from loose, imperfect attachments is one of very considerable magnitude, short circuits, resulting in fire hazards, often resulting.

It is therefore one object of the present invention to provide a bushing entrable into any of the usual cable receiving openings in the walls of an outlet or junction box, of any common type, the connection being made entirely from the exterior of the box.

It is a further feature to provide means for positively locking the bushing to a box in a manner to permit relative rotation but prevent separation unless the locking means be released.

Another purpose is to produce a simple unitary bushing having a cable engaging socket carrying means to grip the cable and a smoothly curved passage for the wires leading from a cable to avoid their abrasion.

These several advantageous features are accomplished by the novel design, construction and arrangement of parts hereinafter described and illustrated in the accompanying drawing, constituting a component of this disclosure, and in which:—

Figure 1 is a longitudinal sectional view taken through the center of a bushing made in accordance with the invention and illustrating its application.

Figure 2 is a side elevational view of the same.

Figure 3 is a transverse sectional view taken on line 3—3 of Figure 1.

Figure 4 is an end view of the bushing and its locking means, the cable showing in transverse section.

Figure 5 is a sectional view similar to Figure 1 but showing the parts as being turned axially through an angle of ninety degrees.

In the illustrations the numeral 10 designates generally a fragmentary portion of a conventional type of outlet or junction box, the same having any required number of circular openings 11 provided with "knock-out covers" (not shown) to be removed from an opening into which a cable 12 is to be inserted.

The cable, here shown as of the armored or steel clad type, carries two or more insulated conductors 13 and 13' with which connection is to be made inside the box, all these parts being of well known construction.

The invention consists of a metal bushing, generally designated by the numeral 14, having a chamber 15 to receive the cable 12, its end abutting an internal shoulder 16 containing an opening 17 through which the conductors 13—13' freely pass, the edges of this opening being smoothly rounded presenting interior surfaces equivalent to those of a round wire ring, this annulus 18 extending from the inner end of the bushing.

The main body of the bushing is essentially cylindrical except at one point where an angular hump 18' is formed and into one of the faces of which is threaded a set screw 19, its point impinging tangentially on the surface of the cable 12, clamping it firmly within the chamber 15 in a manner far superior to that of a radial screw.

Adjacent the annulus 18 is a circular base flange 20, exceeding the diameter of the box opening 11 and next to the flange is a reduced step 21 corresponding to the size of the opening 11, the length of the step being equivalent to the thickness of the box wall or slightly less.

The diameter of the bushing is considerably less than the diameter of the opening 11 for a purpose later seen and the base portion of the bushing is flattened or preferably formed with recesses 22 in its opposite sides, these recesses reaching through the flange 20, step 21 and partially into the main body, terminating at raised arcuate ridges 23 extending outwardly from the wall of the bushing.

Now, as the distance between the outermost edge of the flange 20 and body 14, at a point diametrically opposite, is very slightly less than the diameter of the opening 11 in the box and the sides of the flange and step are recessed, it is possible to enter the bushing base through the opening, by presenting it at an acute angle axially to the box and having been so entered thereafter forcing it to stand perpendicular, the seat 21 at that time filling the box opening as shown.

In order to retain the bushing firmly in this its assembled position, a spring wire of suitable size is bent to produce a keeper consisting of an arch 24 having parallel ends 25 bent in parallel as at 26 and then offset to produce opposed curved sides 27, terminating in spaced parallel ends 28.

The ends 28 may be sprung apart to pass over the body of the bushing, under the ledges 23 and the main portions of the curved elements 27 seat on the surface of the box.

The curved side elements 27 may be bowed slightly upward, as at 27', thereby, when snapped into place, pressing the ledges outwardly or away from the box and drawing the flange 20 firmly against the margin of the opening 11.

In addition, distinct nodes 29 may be formed on the highest points of the bowed portions 27' of the curved sides 27, the same to enter corresponding notches 30 in the ridges 23, as best seen in Figure 2, thus retaining the keeper from possible separation.

It will be understood that the arch 24 acts as a handle loop with which any suitable implement may be engaged when the keeper is to be withdrawn and it is to be noted that the bushing is free to turn in the opening, together with its keeper, but is held positively central and perpendicular with respect to the opening and is incapable of longitudinal motion; furthermore the bushing is entered and attached wholly from the outside of the box without tools of any kind being required.

Although the foregoing is descriptive of the preferred embodiment of the invention, it will be apparent that changes in the form, arrangements, proportions, sizes and details thereof may be made without departing from the scope of the invention as defined in the appended claims.

Having thus described my invention, what I claim as new and desire to secure by Letters Patent, is:—

1. The combination with an outlet box having cable receiving openings, of a bushing having a flange of greater diameter than the openings in the box, a stepped portion adjacent said flange equivalent in diameter to that of the openings, the body of said bushing being of lesser diameter than the openings, said flange and stepped portion being recessed on two opposite sides to permit entry through any selected opening, outstanding lugs on the body at the ends of the recesses, a yieldable keeper engageable in the recesses of said body, said keeper having parts to contact with the outer surface of the box, lateral nodes on said keeper, said lugs having cooperative notches to receive said nodes thereby to retain the keeper in operative position, and means carried by said bushing to clamp a cable entered therein.

2. The combination with an outlet box having cable receiving openings, of a bushing having a flange of greater diameter than the openings in the box, a reduced step equal to the openings, and a body of lesser diameter, said flange, step and the adjacent portion of the body being recessed on two opposite sides, outstanding notched ledges on said body at the ends of the recesses, a spring wire keeper to straddle said body and engage between said ledges and surface of the box whereby said flange is drawn forcibly against the inner marginal surface of the opening, nodes on said spring wire keeper to engage the notches in the ledges, and means on said bushing to secure a cable entered therein.

This specification signed and witnessed this 30th day of September, 1926.

WILLIAM A. BONNELL.